March 10, 1925. 1,528,825
A. B. HAMILTON
FLUID VALVE LOCK
Filed June 17, 1922 3 Sheets-Sheet 1

Witness:
Jas. E. Hutchinson

Inventor:
Albert B. Hamilton,
By J. E. Hutchinson Jr.
Attorney

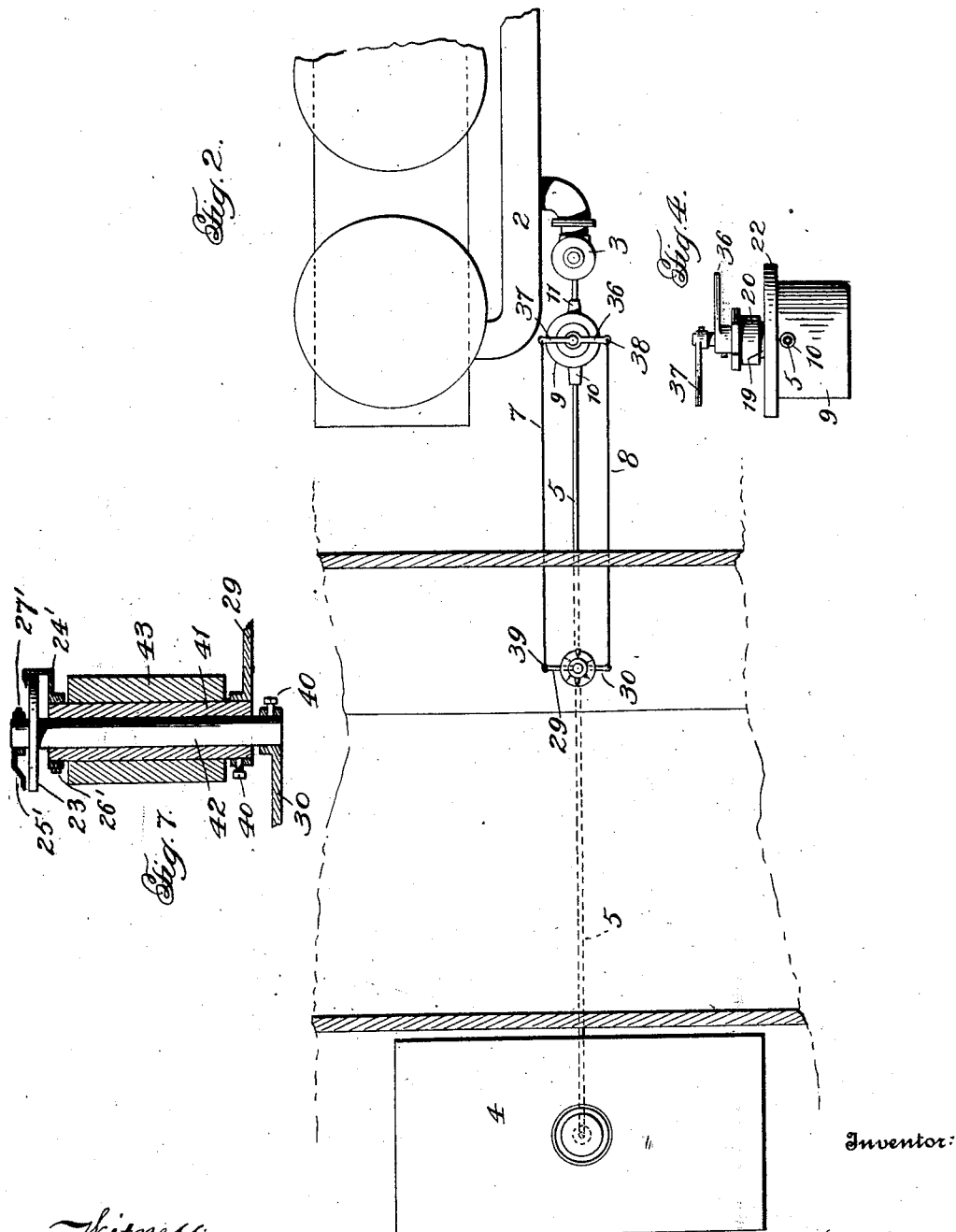

March 10, 1925.
A. B. HAMILTON
FLUID VALVE LOCK
Filed June 17, 1922
1,528,825
3 Sheets-Sheet 3
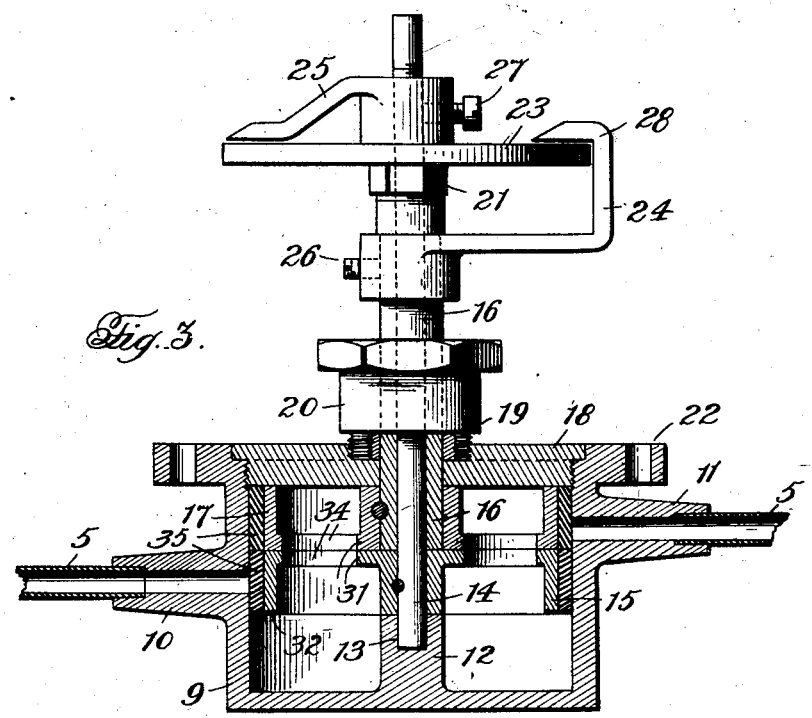
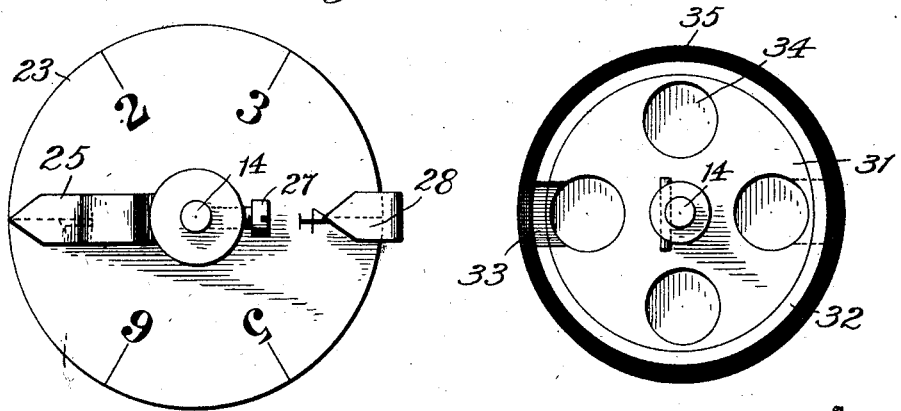

Patented Mar. 10, 1925.

1,528,825

UNITED STATES PATENT OFFICE.

ALBERT B. HAMILTON, OF WASHINGTON, DISTRICT OF COLUMBIA, ASSIGNOR TO HERBERT S. DE LAND, OF WASHINGTON, DISTRICT OF COLUMBIA.

FLUID-VALVE LOCK.

Application filed June 17, 1922. Serial No. 569,061.

*To all whom it may concern:*

Be it known that I, ALBERT B. HAMILTON, a citizen of the United States, residing at 308 10th Street SW., Washington, District of Columbia, have invented certain new and useful Improvements in Fluid-Valve Locks, of which the following is a specification, reference being had therein to the accompanying drawing.

This invention relates to controlling devices and more particularly to permutation locking devices for fuel lines of motor vehicles.

The principal object of the invention is to provide simple and efficient mechanism whereby the passage of fuel, whether in liquid or vaporized form, to the engine may be cut off so that unauthorized use of the machine is effectively prevented.

Many permutation valves have been designed and some I believe have been employed in substantially the same relation as is contemplated here, but to my knowledge all of them have been of such construction that their use was prohibited either by reason of their excessive cost or their inability to effectively perform the function for which they were designed. It is therefore another object of this invention to provide a simple and efficient device which can be installed readily at a nomical cost and which will effectively prevent the unauthorized use of the car irrespective of whether the ignition system can be operated or not.

Still another object of the invention is to provide an improved type of permutation valve which is cheaply constructed and therefore accessible to all motorists and which can be readily repaired and parts replaced conveniently and at small expense.

The convenience of operation and further objects of the invention will appear as the following specific description is read in connection with the accompanying drawings which form a part of this invention, and in which:

Figure 2 is a top plan view of the parts shown in Fig. 1;

Figure 3 is an enlarged sectional view taken through the valve employed in Fig. 1;

Figure 4 is a detailed elevation of the valve when viewed at right angles to the position shown in Fig. 3;

Figure 5 is a detailed top plan view of the dial and combined controlling and indicator hands;

Figure 6 is a detailed plan view of one of the valve disks;

Figure 7 is a detailed sectional view of the controlling mechanism.

Figure 1:
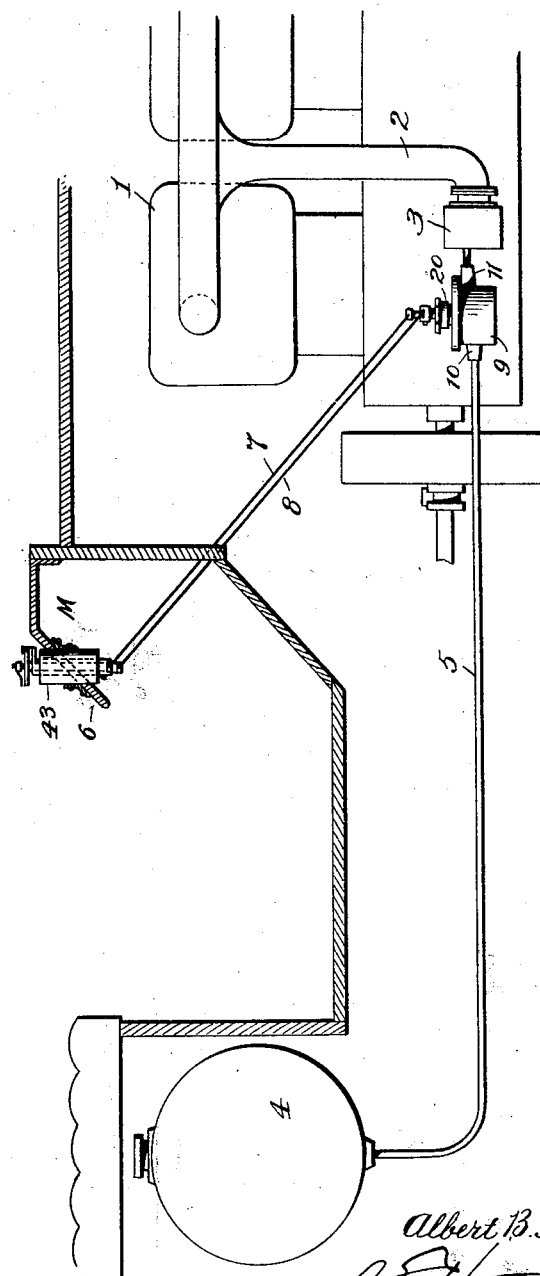
Figure 1 is a detailed elevation of a motor vehicle with parts removed and parts in section to clearly illustrate the application of the invention.

Referring more particularly to Figs. 1 to 7, 1 represents the engine of a motor vehicle, having as is usual an intake manifold 2 connected to the engine at one end and to the carburetor 3 at its opposite end. The carburetor is connected to the supply tank 4 by pipe 5 as is usual and located within the pipe is the permutation valve which forms a part of my invention. As shown in Fig. 1, this valve is controlled and operated from mechanism generally indicated at M upon the instrument board 6 of the automobile and connected to the valve by rods 7 and 8. This valve comprises a housing or casing 9 having located upon one disk an inlet nipple 10 to which the pipe 5 is connected. The opposite side of the casing is provided with an outlet nipple 11 also connected to a part of the fuel tube 5 which leads into the carburetor 3.

Projecting upwardly from the base of the casing is a central stud 12 having a recess or socket 13 formed in its upper end and adapted to receive the lower end of a shaft 14 rotatably mounted therein and carrying a valve disk generally indicated at 15 which is adapted to control the inlet of fuel through the nipple 10.

Surrounding the shaft 14 and rotatably mounted thereon is a sleeve 16 which has keyed thereto a disk 17 similar to the disk 15 and which is adapted to control the outlet of fuel through the passage nipple 11.

The upper end of the casing is closed by a screw threaded cap 18 having a packing gland 19 thereon which is engaged by the packing nut 20. This gland effectively prevents the escape of any fuel around the sleeve 16, while a similar packing gland 21 carried by the upper end of the sleeve effectively prevents any escape of fuel around the shaft 14.

In the construction shown in Fig. 3 the valve is adapted to be connected to the floor boards or other suitable support by means of the bolt-receiving ears 22 with the shaft and sleeve 14 and 16 projecting above the floor boards in position to be rotated as will be hereinafter described when it is desired to control the position of the valve disks 15 and 17.

When used in this manner there is a dial 23 surrounding the shaft and rigidly mounted with respect to the casing over which is adapted to travel the valve controlling and indicating fingers 24 and 25. These fingers are respectively secured by set screws 26 and 27 to the sleeve 16 and shaft 14 and the former finger 24 has a vertical and horizontal extension in the form of a pointer 28 operating over the dial.

When the valve is to be operated from the dash board as shown in Fig. 1, the operating arms 24 and 25 are in the nature of levers and are connected to the operating mechanism M through the rods 7 and 8 which are connected by universal joints with the arms 24 and 25 and with similar arms 29 and 30 to be hereinafter described.

Each valve disk 15 or 17 comprises a flat disk 31 having an annular flange 32 around its outer marginal edge, which flange is provided with an opening 33 adapted to register either with the port in the nipple 10 or the port in the nipple 11 as will be readily understood. The structure of the valve is lightened considerable by providing openings 34 which also serve as passageways between the two valve disks which contact with one another as shown in Fig. 3, one having a depending flange and the other having an upstanding flange with the disk bodies in contact.

Each disk is also provided with a flexible band-like washer 35 extending around and secured to the flange in any suitable manner. This washer is provided to insure tight engagement between the disks and the casing, and is preferably made removable in any suitable manner so that they may be renewed when worn. It will be noticed in this connection that in order to renew the washers all that is necessary is to remove the cap 18 and pull out both valves simultaneously. After their washers have been replaced they can be again placed in the casing and secured by simply screwing the cap 18 back in place.

In the form shown in Figs. 1 and 2 the shaft 14 and sleeve 16 are provided with lever arms 36 and 37 corresponding to the parts 24 and 25, but having connected to their terminal ends by universal joints 38 the operating rods 7 and 8 which are in turn respectively connected by universal joints 39 to the levers 29 and 30. These levers as shown are secured by means of set screws 40 to the sleeve 41 and shaft 42 journaled in the housing 43. The sleeve is journaled directly in the housing and the shaft 42 journaled in the sleeve as will be seen from an inspection of Fig. 7. The upper end of the sleeve 41 has secured thereto a combined indicating and operating finger 24 and the shaft has secured thereto a combined indicating and operating finger 25, both adapted to operate over a dial 23.

In the forms shown in Figs. 1 and 2 the lock valve is located in the fuel line 5 in advance of the carburetor 3 as is shown, but I wish it understood, however, that the operating mechanism M may be located at any point, even below the floor boards and exposed through an opening therein which may be covered in any suitable manner.

In the operation of the device we will say that the port 33 of the lower disk 15 is in register with the inlet nipple 10 and that the port 33 of the upper disk 17 is in register with the outlet nipple 11. The set screws 26 and 27 or those indicated at 26' and 27' may be loosened and the indicating and operating hands set on any given combination of numbers such as 1 and 4 as shown in Fig. 5, and the set screws then tightened. When the operator wishes to lock his car against unauthorized use he simply moves either the finger 24 or the finger 25 one or two points which throws the port of the valve disk out of register with its inlet or outlet opening. He may if desired move both fingers so that the ports 33 of both disks are out of register with their respective openings in the casing. In either event anyone attempting to use the automobile without knowing the combination would be prevented from doing so by reason of the fact that no fuel could be carried to the engine. If only one hand were set by the owner of the vehicle and an unauthorized person attempted to use the vehicle it would be possible for him to operate the wrong hand and thus cause an additional lock to be placed against the passage of fuel, the operation of either valve effectually cutting off fuel to the engine. If at any time the operator desires to change the combination he may loosen one of the set screws 26 or 27 or their equivalent on the operating mechanism, 26' and 27'; move the operating hands 24' and 26' around the sleeve or shaft until the pointer points to the number or numbers which will constitute the new combination. Any change in the combination is of course made when the valve is in open position.

While I have described my invention as applied to permutation valves for controlling and locking the fuel lines of motor vehicles, it will, of course, be understood that such mechanism can be readily applied to the control of other fluid lines such as gas, or water supply systems wherever used.

I claim:—

1. A permutation valve comprising a casing having inlet and outlet openings, a pair of apertured contacting valve disks rotatably mounted in the casing said disks having oppositely extending flanges each provided with a port adapted to register with one of the openings in the casing, packing washers fitted around the flanges and engaged with the inner wall of the casing and means for independently operating the valve disks.

2. A permutation valve comprising a casing having inlet and outlet openings, a pair of apertured valve disks arranged in superposed contacting relation and having oppositely disposed flanges each provided with a port to register with one of the openings in the casing, a dial, and adjustable operating means connected to the disks and operating over the dial.

3. A permutation valve comprising a casing, a stud extending upwardly from the bottom of the casing and provided with a central socket, a shaft journaled in the socket, a sleeve journaled upon the shaft, a closing cap through which the shaft and sleeve project, superposed valve disks carried by the shaft and sleeve and contacting with one another, said disks having oppositely disposed externally packed flanges each provided with a port to register with one of the openings in the casing, a dial and operating means connected to the shaft and sleeve to move over the dial.

4. A permutation valve comprising a casing, a centrally apertured cap closing the casing, a stud on the bottom of the casing aligned with the opening in the cap, a sleeve passing through the aperture in said cap and resting upon said stud, a shaft passing through the sleeve and journaled in a socket in the stud, valve disks keyed to the sleeve and shaft and arranged in superposed relation in contact with one another, said disks having oppositely disposed externally packed flanges each provided with a port adapted to register with one of the ports in the casing, a dial, operating members arranged to turn over the dial and adjustable connections between the operating members and the shaft and sleeve.

In testimony whereof I affix my signature in the presence of two witnesses.

ALBERT B. HAMILTON.

Witnesses:
H. N. RAMSEY,
C. W. HUTCHINSON.